(12) United States Patent
Mori

(10) Patent No.: US 7,219,552 B2
(45) Date of Patent: May 22, 2007

(54) SCALABLE HIGH SENSITIVITY MAGNETOSTRICTIVE PRESSURE SENSOR

(75) Inventor: Teruo Mori, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/547,540

(22) PCT Filed: Mar. 11, 2004

(86) PCT No.: PCT/JP2004/003235

§ 371 (c)(1),
(2), (4) Date: Sep. 1, 2005

(87) PCT Pub. No.: WO2004/088258

PCT Pub. Date: Oct. 14, 2004

(65) Prior Publication Data

US 2006/0174711 A1     Aug. 10, 2006

(30) Foreign Application Priority Data

Mar. 31, 2003  (JP) .............................. 2003-094688

(51) Int. Cl.
*G01L 9/10*  (2006.01)
(52) U.S. Cl. ............................... 73/722; 73/728
(58) Field of Classification Search ............... 702/189, 702/45; 73/753, 731, 722, 728
See application file for complete search history.

(56) References Cited

U.S. PATENT DOCUMENTS 4,896,544 A * 1/1990 Garshelis ............... 73/862.333
5,052,232 A * 10/1991 Garshelis ............... 73/862.336
5,280,729 A * 1/1994 Aoki et al. ............ 73/862.333
7,058,549 B2 * 6/2006 Gysling et al. ............. 702/189

FOREIGN PATENT DOCUMENTS

| DE | 1145 827 | 3/1963 |
|---|---|---|
| GB | 963965 | 7/1964 |
| JP | A-47-37875 | 12/1972 |
| JP | U-52-91088 | 7/1977 |
| JP | A-02-138842 | 5/1990 |
| JP | U-03-10235 | 1/1991 |
| JP | A-11-044597 | 2/1999 |
| JP | A-11-287725 | 10/1999 |

* cited by examiner

*Primary Examiner*—Andre J. Allen
(74) *Attorney, Agent, or Firm*—Oliff & Berridge, PLC

(57) ABSTRACT

A pressure sensor 10 includes a casing 12 configured to be able to be filled with a fluid 16 such as a liquid or a gas, in which at least part of a surface contacting this fluid 16 is formed of a giant magnetostrictive member 18 made of a giant magnetostrictive element, and detecting means for detecting a change in magnetic permeability or an amount of remanent magnetization attributable to expansion and contraction of the giant magnetostrictive member 18 based on a pressure change of the fluid 16 filled in this casing 12. The pressure sensor 10 can detect pressure at high sensitivity and high accuracy in a short time while achieving miniaturization of a device at the same time.

13 Claims, 5 Drawing Sheets

SCALABLE HIGH SENSITIVITY MAGNETOSTRICTIVE PRESSURE SENSOR

TECHNICAL FIELD

The present invention relates to a pressure sensor configured to detect a pressure change of a fluid by use of a change in magnetic susceptibility attributable to expansion and contraction of a magnetostrictor. More specifically, the present invention relates to a pressure sensor which is capable of achieving miniaturization of a device and simultaneously detecting pressure at high sensitivity and high accuracy in a short time.

BACKGROUND ART

A diaphragm pressure sensor configured to convert flexure (displacement) of a diaphragm pressurized by a fluid into an electric signal and to detect a pressure change based on this electric signal has been conventionally proposed as one of pressure sensors capable of detecting a pressure change of a fluid such as a liquid or a gas (see Japanese Patent Laid-Open Publication No. Hei 11-44597, for example).

However, such a diaphragm pressure sensor is configured to detect pressure by use of the flexure of the diaphragm. Accordingly, the diaphragm pressure sensor has problems that a relatively long time period is required for detection, and that it is difficult to achieve measurement at high accuracy because the displacement of the diaphragm generally shows a non-linear characteristic.

In recent years, a pressure sensor applying a magnetostrictor is drawing attention as a measure for solving these problems. The pressure sensor applying a magnetostrictor utilizes a characteristic of the magnetostrictor that causes a large change in magnetic susceptibility upon application of external stress. Such a pressure sensor is applied to the field of tire pressure detection devices (see Japanese Patent Laid-Open Publication No. Hei 11-287725), for example.

As shown in FIG. 5, a pressure sensor 1 applied to this tire pressure detection device is configured to apply a compressive force caused by internal pressure of a tire to a giant magnetostrictive material 3 via a push rod 2. Moreover, a coil 4 disposed around this giant magnetostrictive material 3 detects a change in magnetic susceptibility of the giant magnetostrictive material 3 and thereby the device measures air pressure in the tire.

However, this publicly known conventional pressure sensor 1 is configured to apply the air pressure of the tire being the measuring object to the giant magnetostrictive material 3 via the push rod 2, and therefore has problems of a difficulty to detect a small change of the air pressure, and of reduction in sensitivity and accuracy of pressure measurement.

Moreover, the giant magnetostrictive material 3 is made of a bar member, and is configured to receive the compressive force from the push rod 2 only by use of an end face in an axial direction thereof. Accordingly, there is a problem that the compressive force of this push rod 2 acts on a small area and an amount of deformation (the change in magnetic susceptibility) of the giant magnetostrictive material 3 is therefore small.

DISCLOSURE OF THE INVENTION

The present invention has been made to solve the foregoing problems. An object of the present invention is to provide a pressure sensor which is capable of achieving miniaturization of a device and simultaneously detecting pressure at high sensitivity and high accuracy in a short time.

As a result of research, the inventor of the present invention has accomplished a measure which can detect a small pressure change of a fluid at high sensitivity and high accuracy.

Accordingly, various exemplary embodiments of the invention provide:

(1) A pressure sensor comprising: a casing configured to be able to be filled with a fluid such as a liquid or a gas, at least part of a surface of the casing contacting the fluid being formed of a magnetostrictive member made of a magnetostrictor; and detecting means for detecting a change in any of magnetic permeability and an amount of remanent magnetization attributable to expansion and contraction of the magnetostrictive member based on a pressure change of the fluid filled in the casing.

(2) The pressure sensor according to (1), wherein the detecting means includes a pickup coil surrounding the magnetoresistive member, and the pressure sensor is configured to detect the change in any of the magnetic permeability and the amount of remanent magnetization as a change in inductance of the pickup coil.

(3) The pressure sensor according to (1), wherein the detecting means includes any of a Hall element and a magnetoresistive effect element, and the pressure sensor is configured to detect the change in any of the magnetic permeability and the amount of remanent magnetization as a change in an electromotive force of any of the Hall element and the magnetoresistive effect element.

(4) The pressure sensor according to any one of (1) to (3), wherein part of the casing is formed of the magnetostrictive member of a substantially cylindrical shape.

(5) The pressure sensor according to (4), wherein an end in an axial direction of the magnetostrictive member is formed into a bottom.

(6) The pressure sensor according to any one of (1) to (4), wherein the casing comprises the magnetostrictive member of a substantially cylindrical shape, a pair of lids of substantially a discoid shape disposed to cover open portions on both ends in an axial direction of the magnetostrictive member, and a passage for introducing the fluid into an internal space of the magnetostrictive member is formed at least on one of the pair of lids.

(7) The pressure sensor according to (6), further comprising: a bolt disposed in an axial direction of the casing to penetrate the internal space of the magnetostrictive member and the pair of lids, and configured to fasten and fix the pair of lids to the magnetostrictive member in the axial direction, wherein the passage is formed on this bolt.

(8) The pressure sensor according to any one of (4) to (7), wherein a thickness in a radial direction of the magnetostrictive member is set in a range from 0.05 (mm) to 5 (mm) when a Young's modulus of the magnetostrictive member of the substantially cylindrical shape is equal to $3 \times 10^6$ (N/cm$^2$) and pressure applied from the fluid to the magnetostrictive member is equal to 980 (Pa).

(9) The pressure sensor according to any one of (1) to (8), further comprising: a bias magnet configured to be able to apply a bias magnetic field in an axial direction of the magnetostrictive member.

(10) The pressure sensor according to any one of (1) to (9), further comprising: a preload member configured to apply a compressive preload in an axial direction of the magnetostrictive member.

(11) The pressure sensor according to any one of (1) to (10), wherein the magnetostrictive member is formed of a giant magnetostrictive member applying a giant magnetostrictive element as a material.

BEST MODES FOR CARRYING OUT THE INVENTION

Now, examples of an embodiment of the present invention will be described below with reference to the accompanying drawings.

Figure 1:
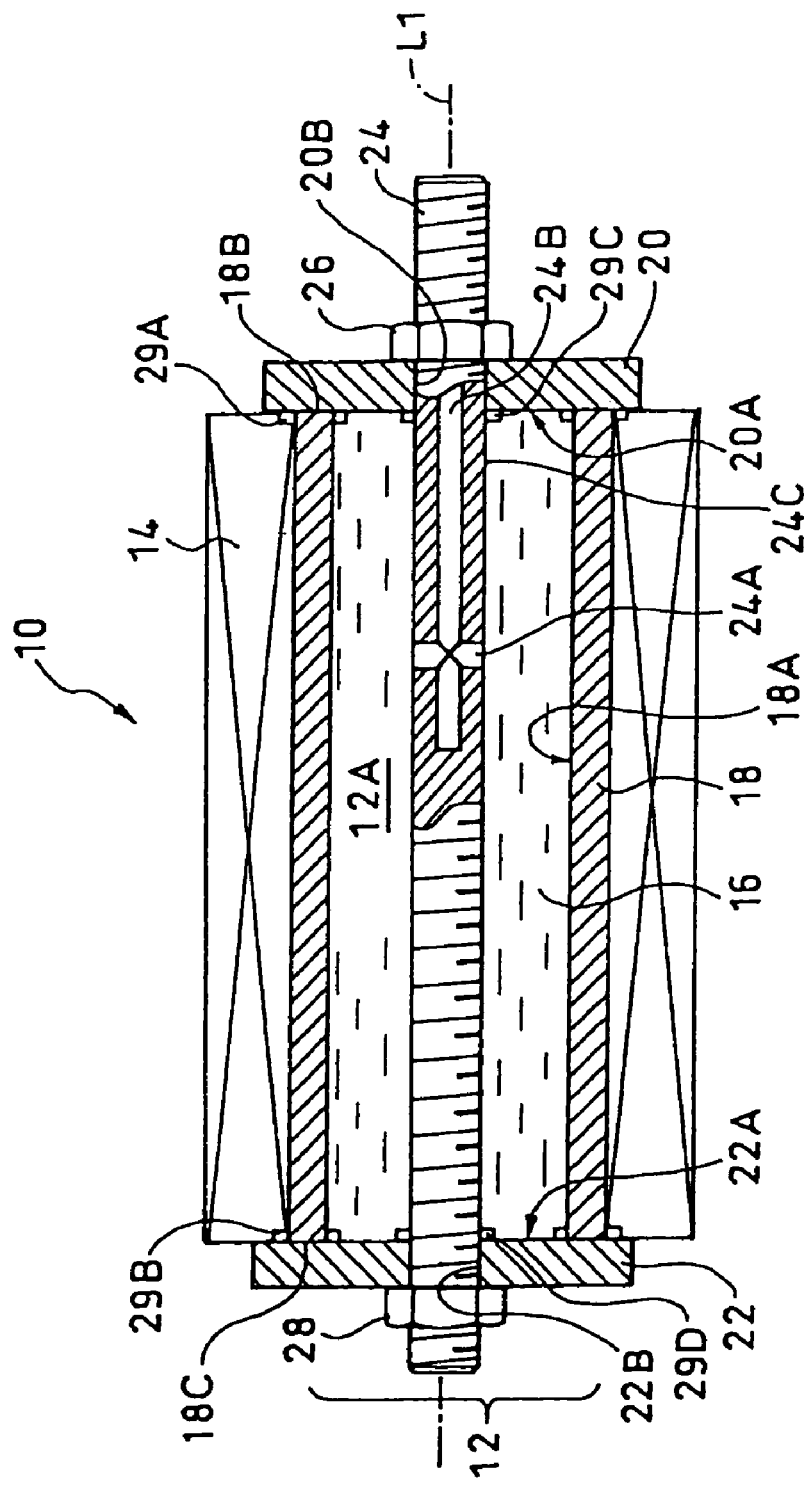
FIG. 1 is a schematic diagram showing a cross section of a pressure sensor according to an example of an embodiment of the present invention.

As shown in FIG. 1, a pressure sensor 10 according to an example of an embodiment of the present invention includes a casing 12 and a pickup coil (detecting means) 14, and is configured to detect a pressure change of a fluid 16 filled in this casing 12 by use of the pickup coil 14 (to be described later).

The casing 12 includes a giant magnetostrictive member 18 of a substantially cylindrical shape laid horizontally in FIG. 1, a pair of first and second bias magnets (lids) 20 and 22, a bolt 24, and a pair of nuts 26 and 28.

The pickup coil 14 has a substantially cylindrical shape, and is coaxially disposed outside the giant magnetostrictive member 18, which is laid horizontally in FIG. 1, so as to surround the giant magnetostrictive member 18.

Each of the first and second bias magnets 20 and 22 is made of a magnetic member of a substantially discoid shape. The first and second bias magnets 20 and 22 are disposed so as to respectively cover both open portions in a direction of an axis L1 of the giant magnetostrictive member 18 having the substantially cylindrical shape, and in close contact therewith.

In this way, in the casing 12, an internal space 12A to be defined by an inner peripheral surface 18A of the giant magnetostrictive member 18 and end surfaces 20A and 22A in the axial direction of the first and second bias magnets 20 and 22 is formed further inside the giant magnetostrictive member 18.

The bolt 24 is disposed in a lateral direction in FIG. 1 so as to penetrate this internal space 12A as well as bolt holes 20B and 22B of the first and second bias magnets 20 and 22. Moreover, the bolt 24 fastens and fixes the first and second bias magnets 20 and 22 to the giant magnetostrictive member 18 in the direction of the axis L1 by use of the pair of nuts 26 and 28 that are screwed thereon from both ends in the axial direction. As a result, the first and second bias magnets 20 and 22 apply a compressive preload and a bias magnetic field to this giant magnetostrictive member 18 in the direction of the axis L1, hence the pressure sensor 10 is configured to be able to enhance efficiency by an increase in a change in magnetic susceptibility of the giant magnetostrictive member 18.

Here, packings 29A and 29B of a substantially ring shape are respectively provided in spaces between end surfaces 18B and 18C in the axial direction of the giant magnetostrictive member 18, and, the end surfaces 20A and 22A of the first and second bias magnets 20 and 22 abutting thereon. Meanwhile, packings 29C and 29D of a substantially ring shape are respectively disposed in spaces between an outer peripheral surface 24C in a radial direction of the bolt 24, and, inner peripheral surfaces of the bolt holes 20B and 22B of the first and second bias magnets 20 and 22 penetrated by the bolt 24. In this way, high airtightness is ensured in the internal space 12A of the casing 12 by the packings 29A to 29D, whereby the casing 12 is configured to be able to be filled with the fluid 16 inside.

A through hole 24A is formed in the vicinity of a central portion in the axial direction of the bolt 24 so as to penetrate this bolt 24 in a diametrical direction. Meanwhile, a communicating hole 24B is formed in the axial direction from the end (on the right side in the drawing) in the axial direction to the through hole 24A. In other words, the internal space 12A of the casing 12 communicates with the outside of the casing 12 via the through hole 24A and the communicating hole 24B of the bolt 24, and is thereby configured to be able to introduce the fluid 16 outside the casing 12 into the internal space 12A of the casing 12.

The giant magnetostrictive member 18 employs a giant magnetostrictive element as its material. Here, the "giant magnetostrictive element" refers to a magnetostrictor, which is made of a powder sintered alloy or a single crystal alloy containing a rare earth element and/or specific transition metal (such as terbium, dysprosium or iron) as a main component. This giant magnetostrictive element has a characteristic to cause a change in magnetic susceptibility when deformed upon application of external stress. The pickup coil 14 can detect a change in magnetic permeability or an amount of remanent magnetization caused by such deformation (contraction) of the giant magnetostrictive member 18 as a change in inductance of the pickup coil 14.

Next, an operation of the pressure sensor 10 according to the example of the embodiment of the present invention will be described.

When a fluid such as a liquid or a gas being an object of pressure detection is filled in (the internal space 12A of) the casing 12 of the pressure sensor 10, pressure is applied from this fluid 16 to the inner peripheral surface 18A of the giant magnetostrictive member 18 and to the end surfaces 20A and 22A of the first and second bias magnets 20 and 22 contacting this fluid 16. Then, the casing 12 is deformed by the pressure from this fluid 16, whereby the giant magnetostrictive member 18 of the substantially cylindrical shape expands in the radial direction and contracts in the axial direction. As a result, the volume of the giant magnetostrictive member 18 in an internal space of the pickup coil 14 is changed, and the magnetic permeability or the amount of remanent magnetization of this giant magnetostrictive member 18 is changed as well. Therefore, it is possible to detect the pressure change of the fluid 16 by detecting the change in the magnetic permeability or the amount of remanent magnetization as a change of an inductance value of the pickup coil 14.

According to the pressure sensor 10 of the example of the embodiment of the present invention, it is possible to apply the pressure of the fluid 16 such as a liquid or a gas directly to the giant magnetostrictive member 18 through no other members. Therefore, the pressure sensor 10 can detect a small pressure change of the fluid 16, which has been conventionally difficult. In this way, high sensitivity and high accuracy pressure detection is feasible. Moreover, since the giant magnetostrictive member 18 is made of a giant magnetostrictive element which has a quick response to the external stress, it is possible to detect pressure in a short time.

Further, the pressure sensor 10 includes the pickup coil 14, and is configured to detect the change in the magnetic permeability or the amount of remanent magnetization of the giant magnetostrictive member 18 as the change in inductance of this pickup coil 14. Accordingly, the pressure sensor 10 can detect the pressure change easily in spite of its simple structure.

In addition, part of the casing 12 is formed of the giant magnetostrictive member 18 of the substantially cylindrical shape and the inner peripheral surface 18A of the giant magnetostrictive member 18 is configured to contact the fluid 16. Accordingly, it is possible to increase a contact area between the giant magnetostrictive member 18 and the fluid 16. In this way, it is possible to detect pressure at higher sensitivity and higher accuracy.

Here, assuming that a Young's modulus of the giant magnetostrictive member 18 is equal to $3 \times 10^6$ (N/cm$^2$) and that the pressure applied from the fluid 16 to this giant magnetostrictive member 18 is equal to 980 (Pa), the thickness in the radial direction of the giant magnetostrictive member 18 of the substantially cylindrical shape is set preferably in a range from 0.05 (mm) to 5 (mm).

Meanwhile, the pressure sensor 10 includes the first and second bias magnets 20 and 22 which can apply a bias magnetic field to the giant magnetostrictive member 18. Accordingly, it is possible to improve a temperature characteristic. To be more precise, the change in inductance of the pickup coil 14 associated with a change in ambient temperature is reduced by application of the bias magnetic field to the giant magnetostrictive member 18 in the direction of the axis L1. Accordingly, it is possible to improve accuracy of the pressure detection by improving the temperature characteristic.

Figure 2:
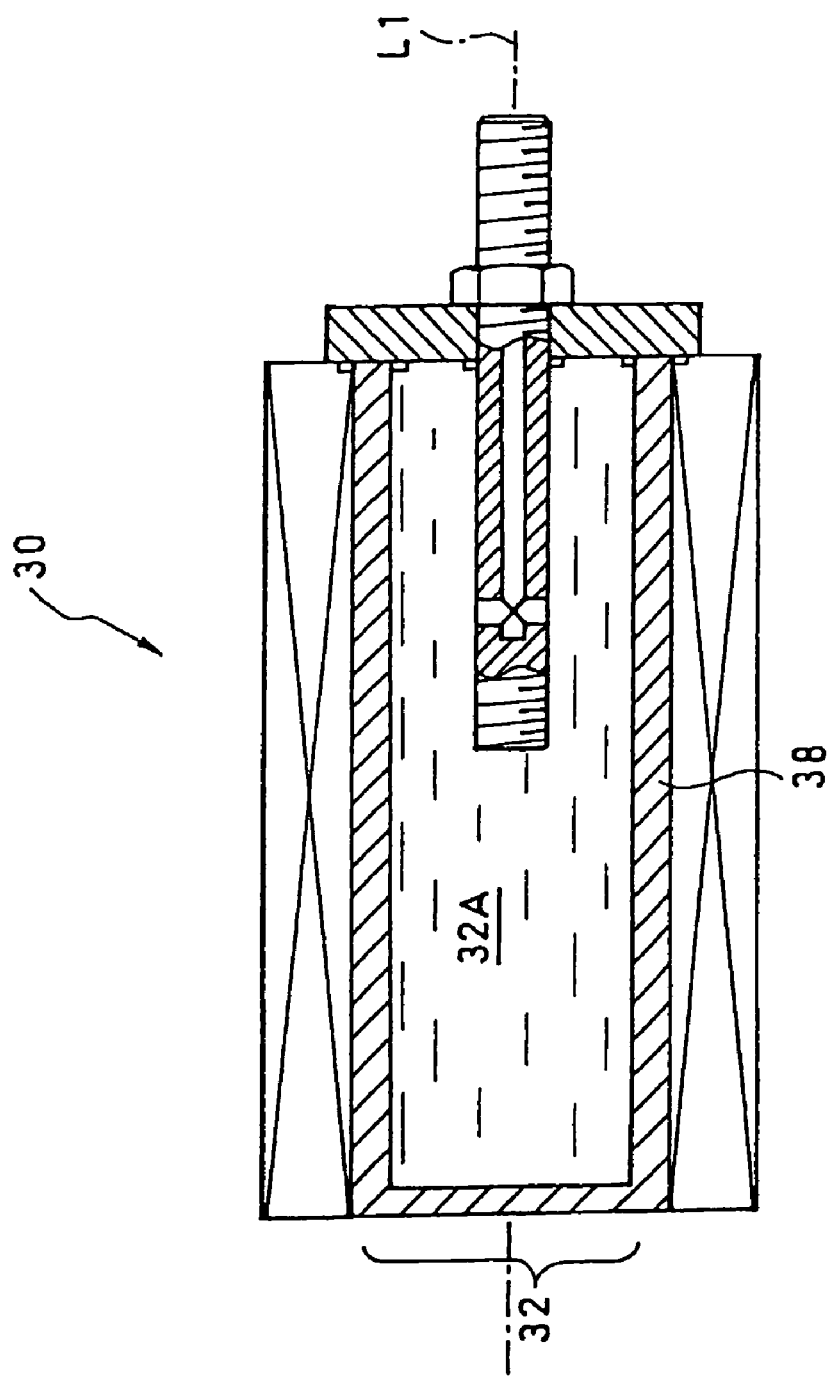
FIG. 2 is a schematic diagram showing a cross section of a pressure sensor according to another example of the embodiment of the present invention.

In the above-described example of the embodiment, part of the casing 12 has been formed of the giant magnetostrictive member 18 of the substantially cylindrical shape. However, the present invention is not limited to this configuration. The casing only needs to be capable of being filled with a fluid such as a liquid or a gas, and at least part of a surface contacting this fluid needs to be formed of a magnetostrictive member made of a magnetostrictor. Therefore, as in a pressure sensor 30 shown in FIG. 2, it is possible to form a casing 32 by use of a giant magnetostrictive member 38 of a substantially cylindrical shape having a bottom on one end in an axial direction (the left side in the drawing), for example. In this case, it is easier to enhance airtightness of an internal space 32A in the casing 32. Moreover, it is possible to reduce the number of components of sealing members such as packings.

Meanwhile, the pair of first and second bias magnets 20 and 22 possessing magnetism have been used as the lids of the giant magnetostrictive member 18 constituting the casing 12. However, the present invention is not limited to this configuration. It is also possible to use a nonmagnetic material as the lids.

Figure 3:
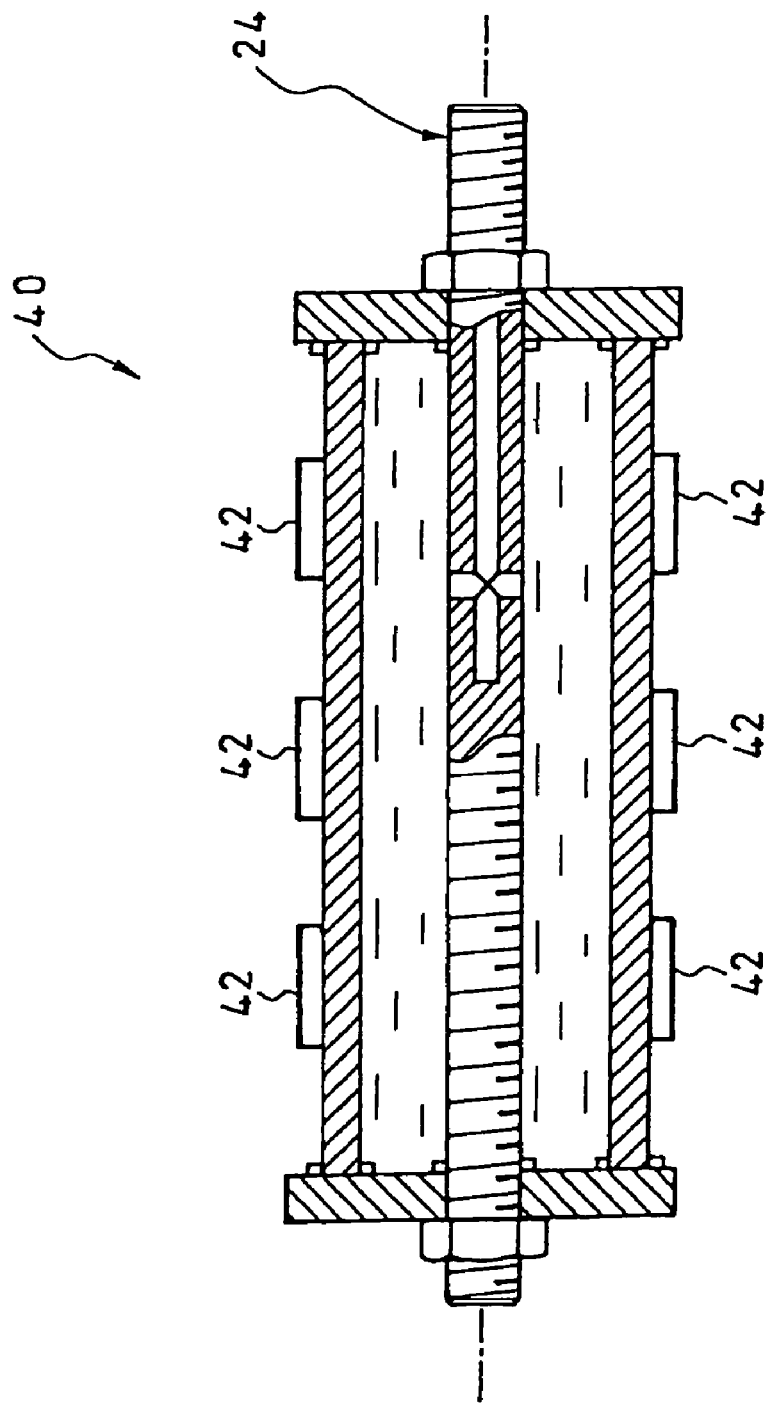
FIG. 3 is a schematic diagram showing a cross section of a pressure sensor applying a Hall element as detecting means.

In the above-described example of the embodiment, the change in the magnetic permeability or the amount of remanent magnetization has been detected as the change in inductance of the pickup coil 14. However, the present invention is not limited to this configuration. It is also possible to apply other detecting means which can detect a change in magnetic permeability or an amount of remanent magnetization of a (giant) magnetostrictive member. Therefore, as in a pressure sensor 40 shown in FIG. 3, it is possible to apply a Hall element 42 as the detecting means, and to detect the change in the magnetic permeability or the amount of remanent magnetization as a change in an electromotive force of this Hall element 42, for example.

Figure 4:
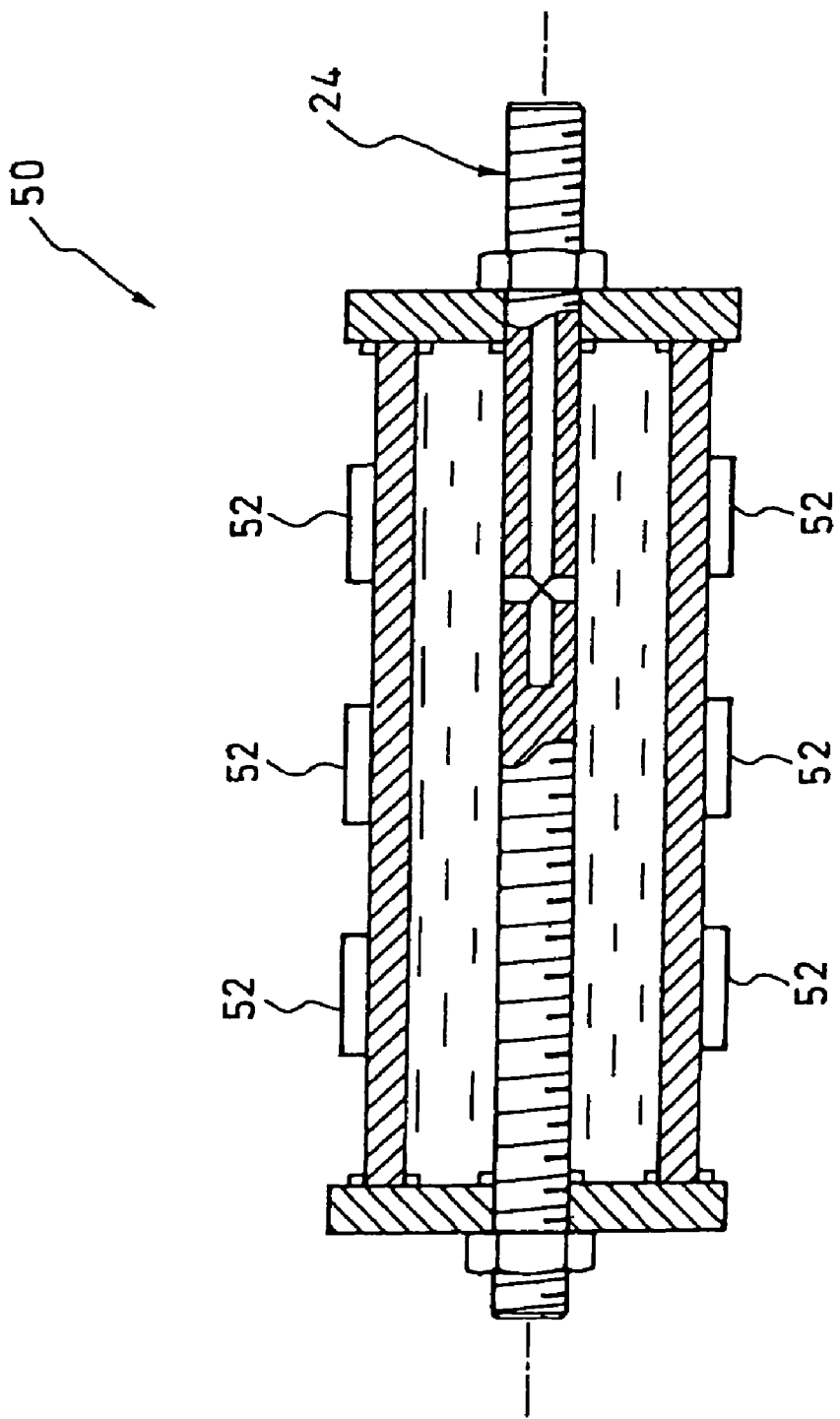
FIG. 4 is a schematic diagram showing a cross section of a pressure sensor applying a magnetoresistive effect element as the detecting means.
Figure 5:
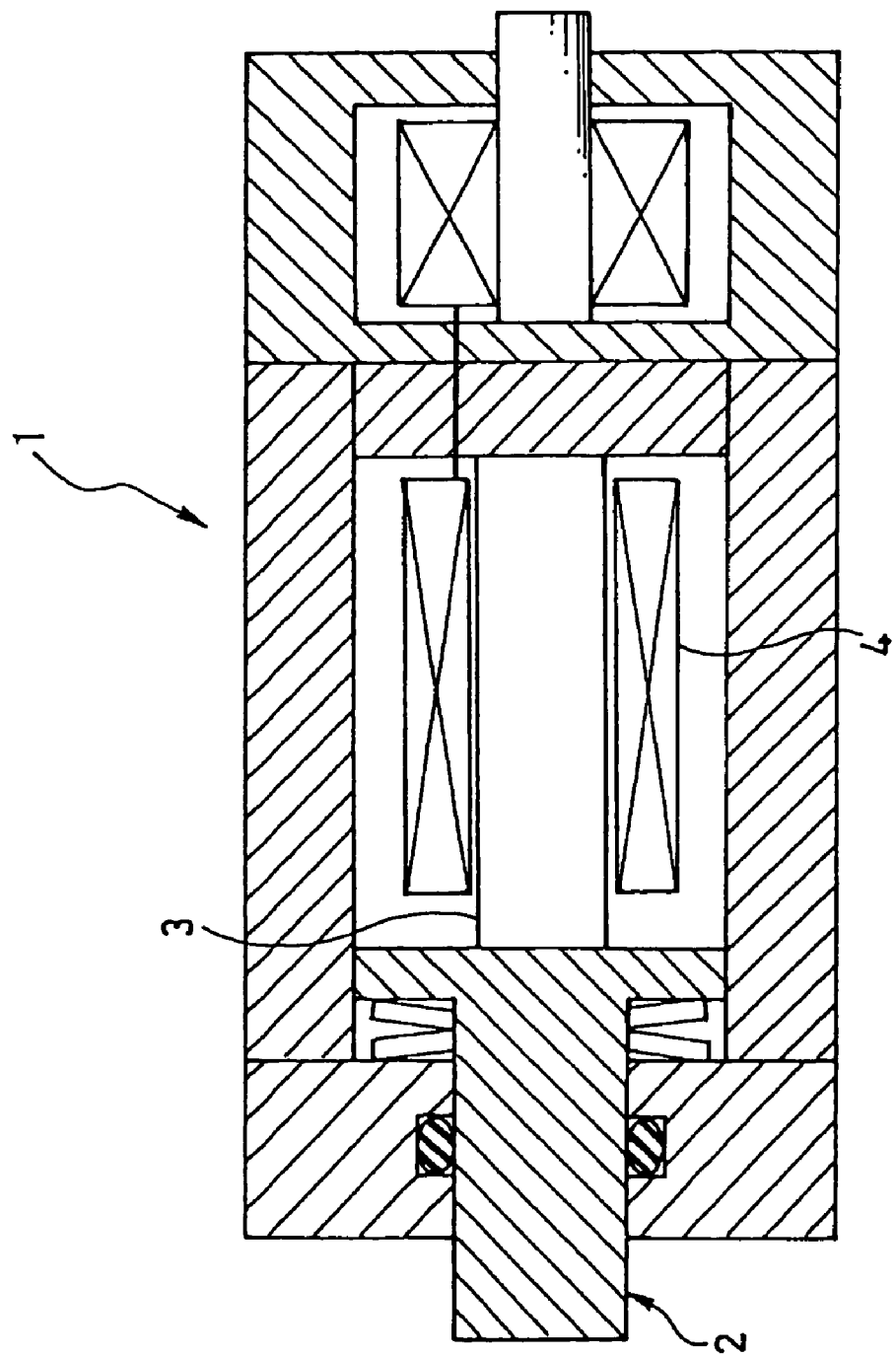
FIG. 5 is a schematic diagram showing a cross section of a conventional pressure sensor.

Alternatively, as in a pressure sensor 50 shown in FIG. 4, it is possible to apply a magnetoresistive effect element 52 as the detecting means, and to detect the change in the magnetic permeability or the amount of remanent magnetization as a change in an electromotive force of this magnetoresistive effect element 52.

Moreover, in the above-described example of the embodiment, the pressure sensor 10 has been formed of the giant magnetostrictive member 18 made of the giant magnetostrictive element. However, the present invention is not limited to this configuration. It is also possible to use a magnetostrictive member made of a magnetostrictor.

INDUSTRIAL APPLICABILITY

The pressure sensor of the present invention has an excellent effect that it is possible to detect pressure at high sensitivity and high accuracy in a short time while achieving miniaturization of a device at the same time.

The invention claimed is:
1. A pressure sensor comprising:
a casing configured to be able to be filled with a fluid such as a liquid or a gas, at least part of a surface of the casing contacting the fluid being formed of a magnetostrictive member made of a magnetostrictor and of a substantially cylindrical shape;
a pair of lids of substantially a discoid shape disposed to cover open portions on both ends in an axial direction of the magnetostrictive member;
a passage for introducing the fluid into an internal space of the magnetostrictive member is formed at least on one of the pair of lids; and
a detecting means for detecting a change in any of magnetic permeability and an amount of remanent magnetization attributable to expansion and contraction of the magnetostrictive member based on a pressure change of the fluid filled in the casing.
2. The pressure sensor according to claim 1, wherein
the detecting means includes a pickup coil surrounding the magnetoresistive member, and
the pressure sensor is configured to detect the change in any of the magnetic permeability and the amount of remanent magnetization as a change in inductance of the pickup coil.
3. The pressure sensor according to claim 1, wherein
the detecting means includes any of a Hall element and a magnetoresistive effect element, and
the pressure sensor is configured to detect the change in any of the magnetic permeability and the amount of remanent magnetization as a change in an electromotive force of any of the Hall element and the magnetoresistive effect element.
4. The pressure sensor according to claim 1, further comprising:
a bolt disposed in an axial direction of the casing to penetrate the internal space of the magnetostrictive member and the pair of lids, and configured to fasten and fix the pair of lids to the magnetostrictive member in the axial direction,
wherein the passage is formed on this bolt.

5. The pressure sensor according to claim 1,
wherein a thickness in a radial direction of the magnetostrictive member is set in a range from 0.05 (mm) to 5 (mm) when a Young's modulus of the magnetostrictive member of the substantially cylindrical shape is equal to $3 \times 10^6$ (N/cm$^2$) and pressure applied from the fluid to the magnetostrictive member is equal to 980 (Pa).

6. The pressure sensor according to claim 2,
wherein a thickness in a radial direction of the magnetostrictive member is set in a range from 0.05 (mm) to 5 (mm) when a Young's modulus of the magnetostrictive member of the substantially cylindrical shape is equal to $3 \times 10^6$ (N/cm$^2$) and pressure applied from the fluid to the magnetostrictive member is equal to 980 (Pa).

7. The pressure sensor according to any of claim 3,
wherein a thickness in a radial direction of the magnetostrictive member is set in a range from 0.05 (mm) to 5 (mm) when a Young's modulus of the magnetostrictive member of the substantially cylindrical shape is equal to $3 \times 10^6$ (N/cm$^2$) and pressure applied from the fluid to the magnetostrictive member is equal to 980 (Pa).

8. The pressure sensor according to any of claim 4,
wherein a thickness in a radial direction of the magnetostrictive member is set in a range from 0.05 (mm) to 5 (mm) when a Young's modulus of the magnetostrictive member of the substantially cylindrical shape is equal to $3 \times 10^6$ (N/cm$^2$) and pressure applied from the fluid to the magnetostrictive member is equal to 980 (Pa).

9. The pressure sensor according to claim 1, further comprising:
a bias magnet configured to be able to apply a bias magnetic field in an axial direction of the magnetostrictive member.

10. The pressure sensor according to claim 2, further comprising:
a bias magnet configured to be able to apply a bias magnetic field in an axial direction of the magnetostrictive member.

11. The pressure sensor according to claim 3, further comprising:
a bias magnet configured to be able to apply a bias magnetic field in an axial direction of the magnetostrictive member.

12. The pressure sensor according to claim 1, further comprising:
a preload member configured to apply a compressive preload in an axial direction of the magnetostrictive member.

13. The pressure sensor according to claim 1, wherein
the magnetostrictive member is formed of a giant magnetostrictive member applying a giant magnetostrictive element as a material.

* * * * *